US011121954B2

(12) United States Patent
Vasseur et al.

(10) Patent No.: US 11,121,954 B2
(45) Date of Patent: Sep. 14, 2021

(54) TELEMETRY COLLECTION AND ANALYSIS FOR SD-WAN TUNNELS

(71) Applicant: Cisco Technnology, Inc., San Jose, CA (US)

(72) Inventors: Jean-Philippe Vasseur, Saint Martin D'uriage (FR); Pascal Thubert, Roquefort les Pins (FR); Patrick Wetterwald, Mouans Sartoux (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/743,064

(22) Filed: Jan. 15, 2020

(65) Prior Publication Data

US 2021/0218658 A1 Jul. 15, 2021

(51) Int. Cl.
H04L 12/26 (2006.01)
H04L 12/24 (2006.01)
H04L 12/801 (2013.01)

(52) U.S. Cl.
CPC ............ H04L 43/12 (2013.01); H04L 41/147 (2013.01); H04L 47/10 (2013.01)

(58) Field of Classification Search
CPC ..... H04L 45/22; H04L 45/28; H04L 43/0864; H04L 43/0876; H04L 43/0811; H04L 41/0668; H04L 43/10; H04L 41/12; H04L 45/125; H04L 12/4633; H04L 12/4641; H04L 43/0817; H04L 45/02; H04L 45/24; H04L 43/04; H04L 47/125; H04L 47/32; H04L 69/40; H04L 45/38; H04L 47/825; H04L 41/14; H04L 43/062; H04L 43/065; H04L 45/302; H04L 45/306; H04L 47/22; H04L 47/24; H04L 47/781; H04L 61/1511; H04L 61/1523; H04L 61/2503; H04L 63/061; H04L 67/141; H04L 67/18;
(Continued)

(56) References Cited

U.S. PATENT DOCUMENTS

| 10,375,090 B2 | 8/2019 | McGrew et al. |
| 2007/0280102 A1 | 12/2007 | Vasseur |
| 2011/0090815 A1* | 4/2011 | Gundavelli ......... H04L 12/4633 370/253 |
| 2013/0259056 A1* | 10/2013 | Kotrabasappa ......... H04L 45/50 370/401 |

(Continued)

OTHER PUBLICATIONS

Frazer, Atchison,"Sophisticated Path Selection Capabilities Underpin SD-WAN Performance", Software-Defined Blog, online: https://www.versa-networks.com/blog/sophisticated-path-selection-capabilities-underpin-sd-wan-performance/, Aug. 13, 2019, 5 pages, Versa Networks.

(Continued)

Primary Examiner — Djenane M Bayard
(74) Attorney, Agent, or Firm — Behmke Innovation Group LLC; Kenneth J. Heywood; Jonathon P. Western

(57) ABSTRACT

In one embodiment, a device in a network sends Bidirectional Forwarding Detection (BFD) probes along a network tunnel associated with the device, to collect telemetry regarding the network tunnel. The device monitors an overhead associated with sending the BFD probes along the network tunnel. The device makes a determination that the overhead associated with sending the BFD probes along the network tunnel is unacceptable. The device switches, based on the determination, from sending BFD probes along the network tunnel to modifying data traffic sent via the network tunnel, to collect telemetry regarding the network tunnel.

20 Claims, 9 Drawing Sheets

(58) Field of Classification Search
CPC ... H04L 67/327; H04L 45/745; H04L 45/121; H04L 45/50; H04L 45/64; H04L 45/586; H04L 41/0654; H04L 41/0659; H04L 41/0663; H04L 41/0816; H04L 45/00; H04L 1/203; H04L 41/0677; H04L 43/0847; H04L 43/16; H04L 45/12; H04L 45/124; H04L 45/70; H04L 41/06; H04L 43/0805; H04L 45/58; H04L 49/555; H04L 69/16; H04L 12/18; H04L 12/1863; H04L 12/1877; H04L 41/16; H04L 41/147; H04L 41/5025; H04L 45/04; H04L 45/48; H04L 63/0272; H04L 63/1458; H04L 45/60; H04L 63/1425; H04L 41/5009; H04L 43/0852; H04L 43/087; H04L 45/122; H04L 45/16; H04L 63/029; H04L 12/185; H04L 12/5691; H04L 12/66; H04L 41/5019; H04L 45/08; H04L 45/42; H04L 47/2425; H04L 12/2854; H04L 41/0896; H04L 41/142; H04L 41/5038; H04L 43/103; H04L 61/10; H04L 61/2084; H04L 61/6022; H04L 63/0236; H04L 67/12; H04L 69/324; H04L 69/325; H04L 12/28; H04L 12/462; H04L 2001/0096; H04L 2209/80; H04L 2463/142; H04L 2463/143; H04L 41/0213; H04L 41/0631
See application file for complete search history.

(56) References Cited

U.S. PATENT DOCUMENTS

| | | | |
|---|---|---|---|
| 2015/0085655 A1* | 3/2015 | Jackson | H04L 47/25 370/232 |
| 2019/0036780 A1 | 1/2019 | Evans et al. | |
| 2019/0149474 A1 | 5/2019 | Iyer et al. | |
| 2020/0014616 A1 | 1/2020 | Nithin | |
| 2020/0228455 A1* | 7/2020 | Snowdon | H04L 1/1867 |
| 2020/0314022 A1* | 10/2020 | Vasseur | H04L 41/16 |

OTHER PUBLICATIONS

Katz, et al., "Bidirectional Forwarding Detection (BFD)", Request for Comments 5880, Jun. 2010, 49 pages, Internet Engineering Task Force Trust.

Korhonen, et al., "DetNet Data Plane Encapsulation", Internet Draft: draft-ietf-detnet-dp-sol-02, https://tools.ietf.org/pdf/draft-ietf-detnet-dp-sol-02.pdf, Mar. 5, 2018, 44 pages, IETF Trust.

Precup, Cristina, "Network Predictive Analysis: A Journey into Traffic Forecasting with Deep Learning", online blog: https://xrdocs.io/telemetry/blogs/2018-07-19-network-predictive-analysis/, Jul. 19, 2018, 16 pages, IOS XR Streaming Telemetry @xrdocs.

"IEEE 1588 Protocol Overview", online: https://www.rtautomation.com/technologies/ieee-1588/, printed Dec. 11, 2019, 4 pages, Real Time Automation, Inc.

International Search Report dated Apr. 9, 2021 in connection with International Patent Application No. PCT/US2021/012027.

* cited by examiner

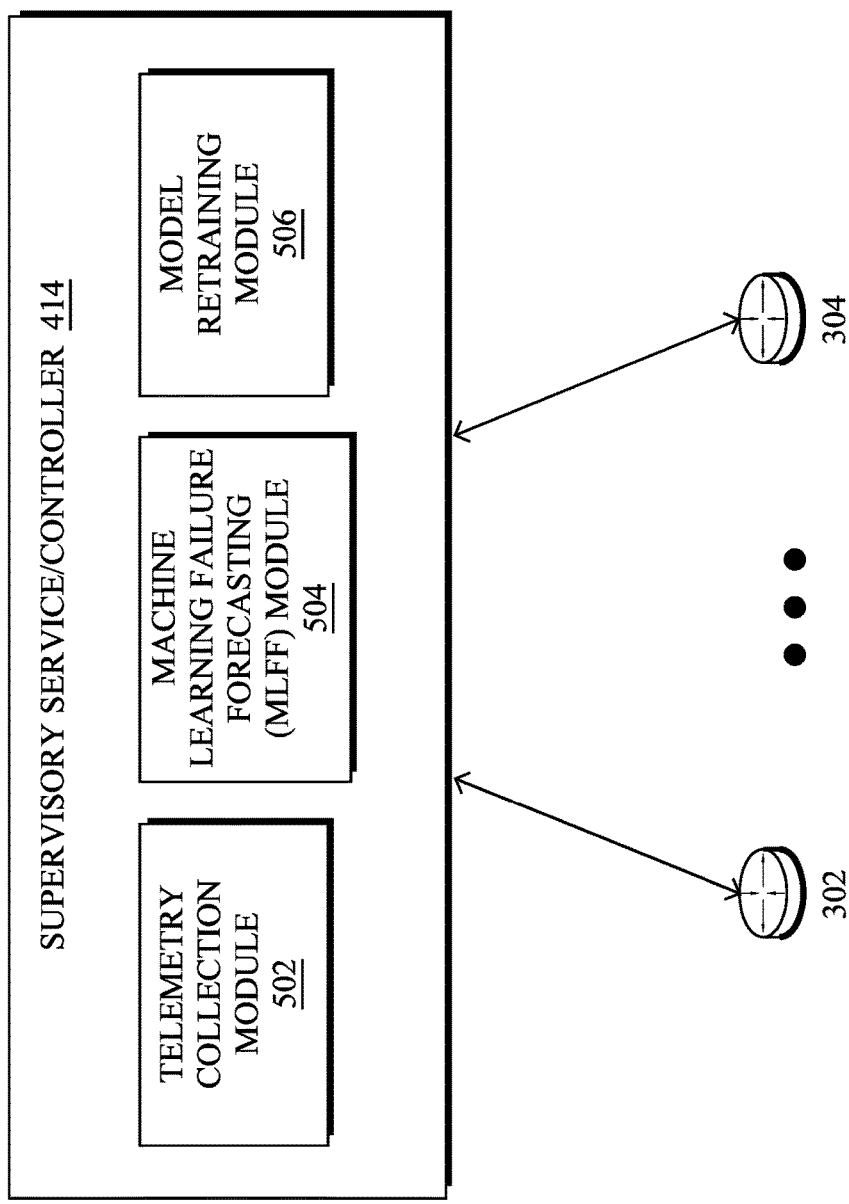

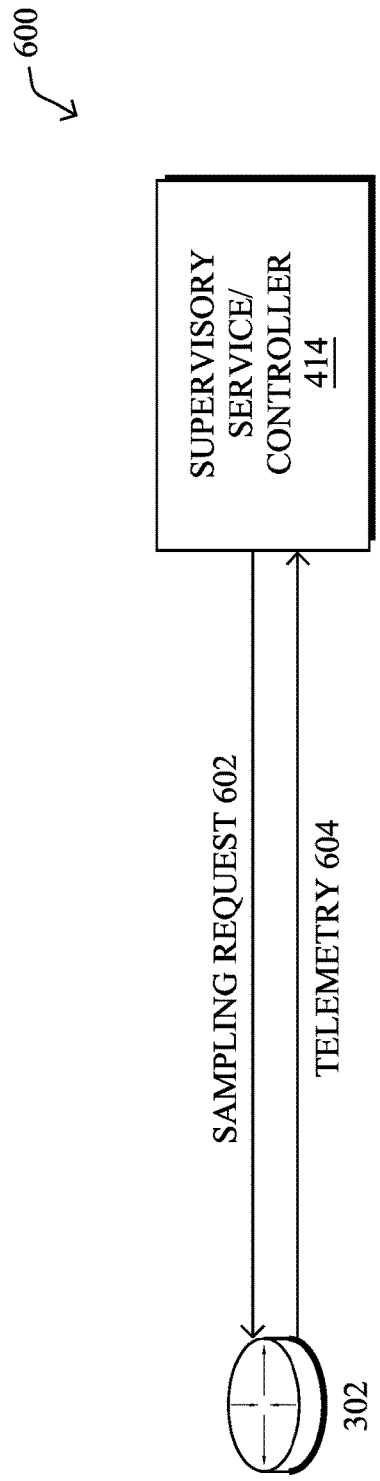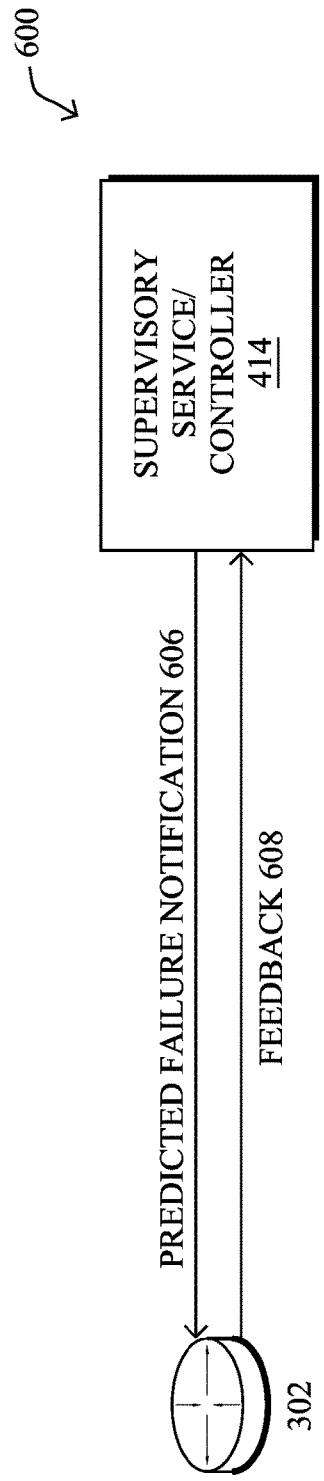
FIG. 6A
FIG. 6B

őTELEMETRY COLLECTION AND ANALYSIS
FOR SD-WAN TUNNELS

TECHNICAL FIELD

The present disclosure relates generally to computer networks, and, more particularly, to the collection and analysis of telemetry for software-defined wide area network (SD-WAN) tunnels.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance metrics that can match application SLAs.

Currently, SD-WAN tunnels are monitored using Bidirectional Forwarding Detection (BFD) probes. This allows the SD-WAN to monitor the performance of the tunnel (e.g., in terms of delay, jitter, etc.). Such information can be used to enable application-aware routing whereby traffic for a specific application is routed via a tunnel selected to satisfy the SLA of the application. In addition, BFD probes are also used for purposed of detecting tunnel failures using a keep-alive mechanism. Under this approach, if the receiver of the BFD probes (e.g., the tail-end router of the tunnel) does not acknowledge the probes within a certain amount of time, the tunnel may be considered to have failed and its traffic rerouted onto another tunnel.

Testing has revealed that BFD probing in an SD-WAN creates a non-negligible amount of overhead on the network, particularly on the head-end router of a tunnel. While relatively rare, this overhead can also lead to BFD sessions timing out and flapping. Additionally, this overhead can also cause BFD-probed tunnels to be miscategorized as being unable to satisfy the SLA of the traffic, even if the traffic itself is not experiencing such a violation.

BRIEF DESCRIPTION OF THE DRAWINGS

FIG. 5 illustrates an example architecture for implementing proactive routing in a network using machine learning;

FIGS. 6A-6C illustrate examples of feedback for tunnel failure predictions; and

DESCRIPTION OF EXAMPLE EMBODIMENTS

Overview

Figure 1A:
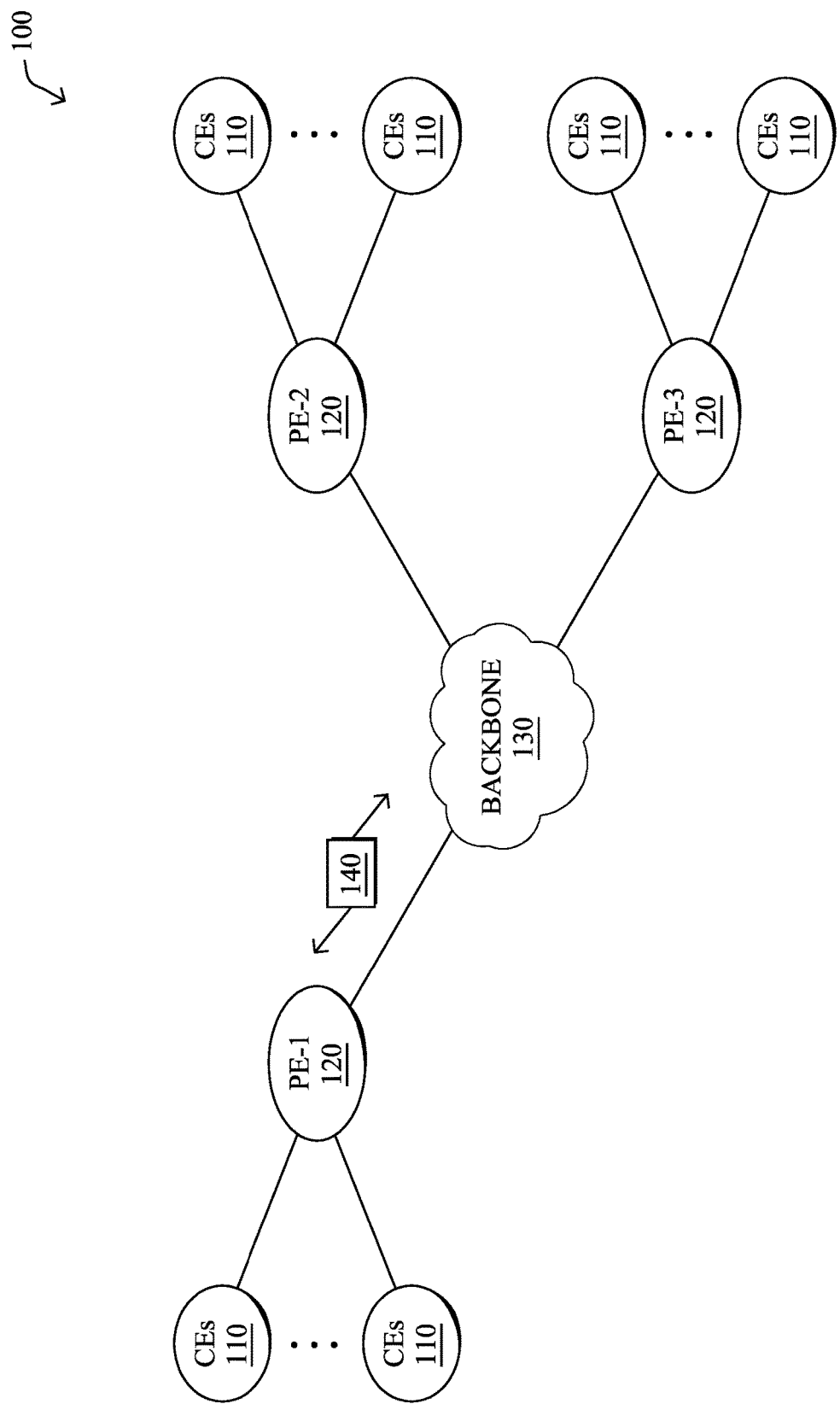
FIGS. 1A-1B illustrate an example communication network.

According to one or more embodiments of the disclosure, a device in a network sends Bidirectional Forwarding Detection (BFD) probes along a network tunnel associated with the device, to collect telemetry regarding the network tunnel. The device monitors an overhead associated with sending the BFD probes along the network tunnel. The device makes a determination that the overhead associated with sending the BFD probes along the network tunnel is unacceptable. The device switches, based on the determination, from sending BFD probes along the network tunnel to modifying data traffic sent via the network tunnel, to collect telemetry regarding the network tunnel.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
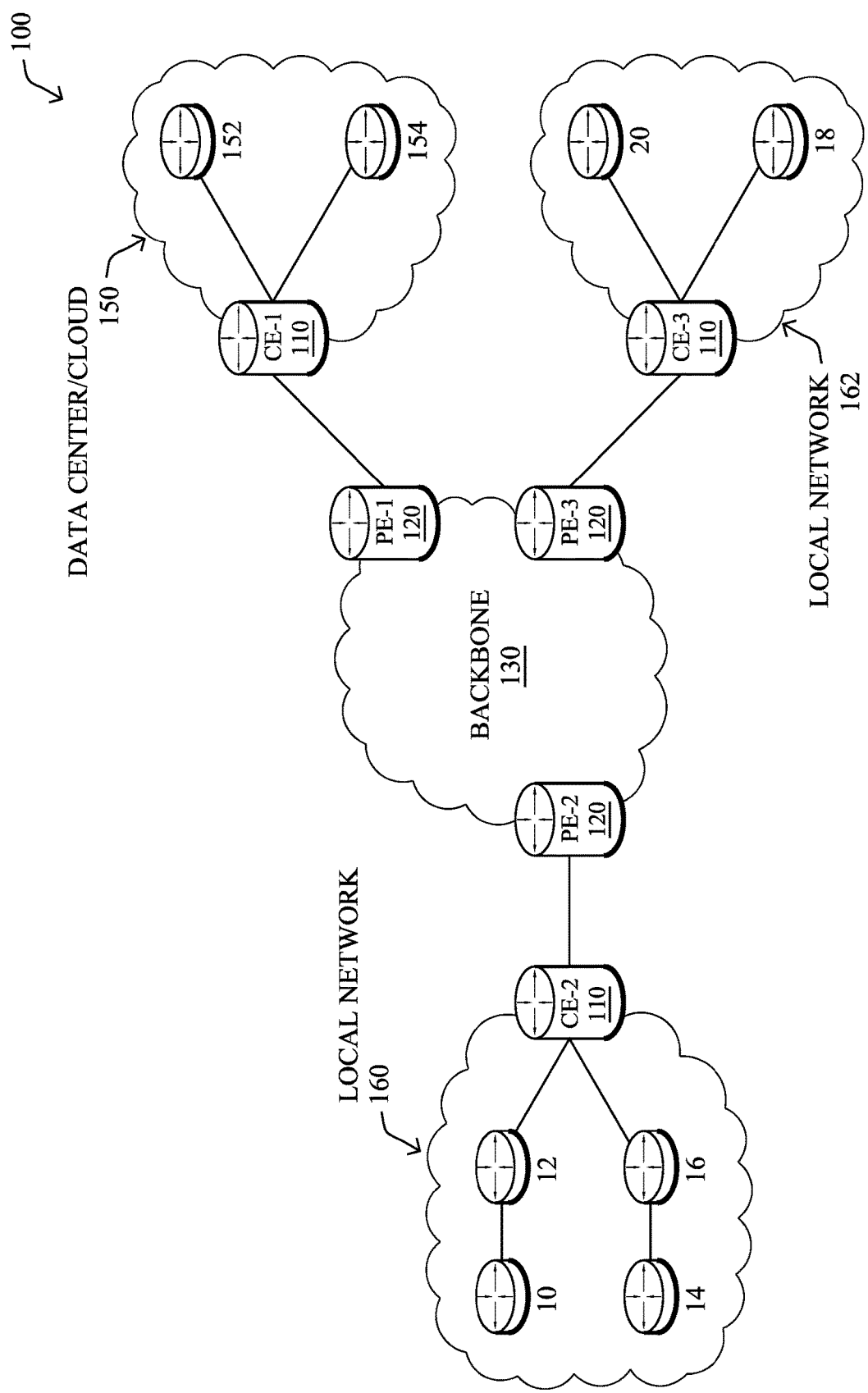

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
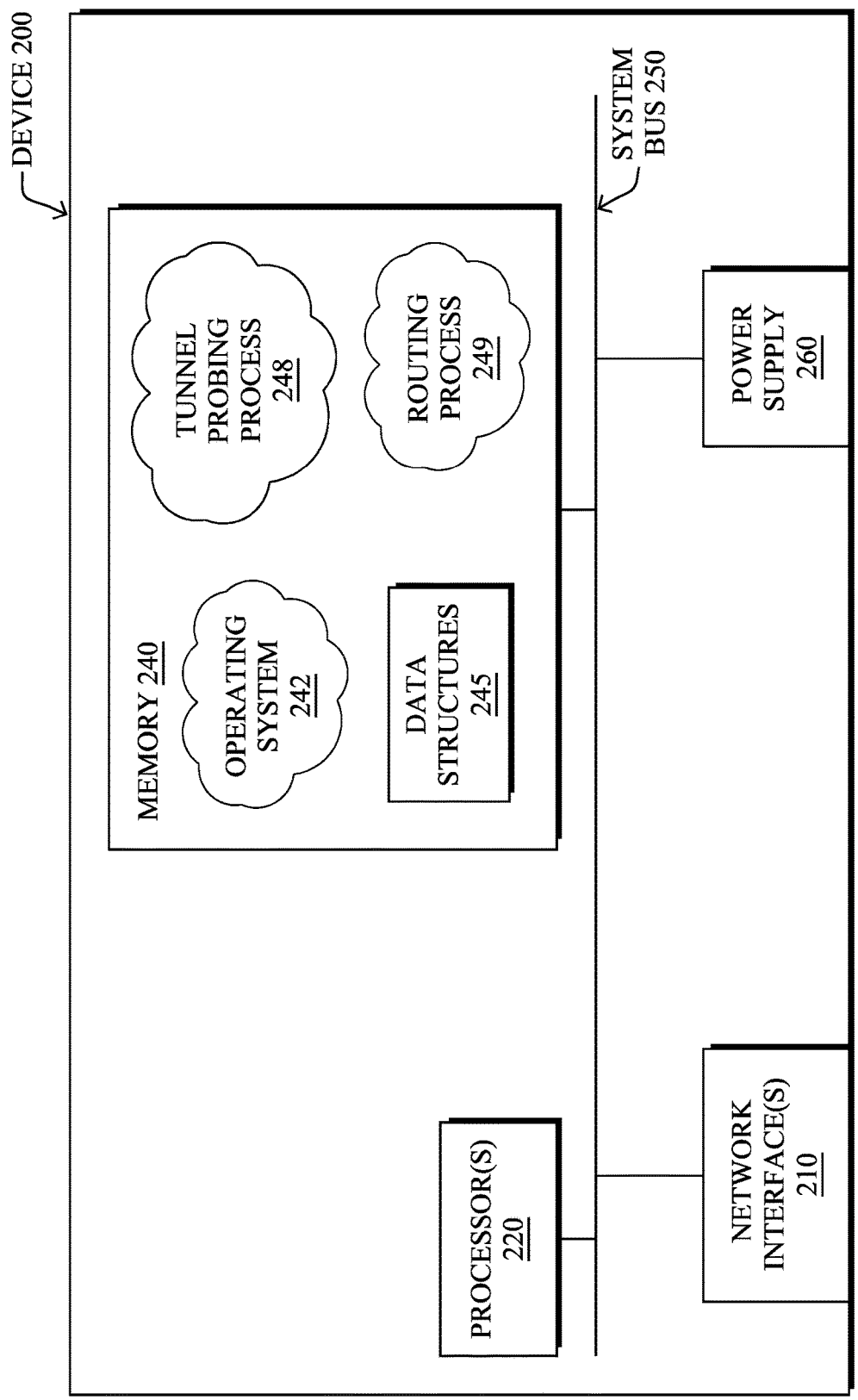
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a tunnel probing process 248 and/or a routing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
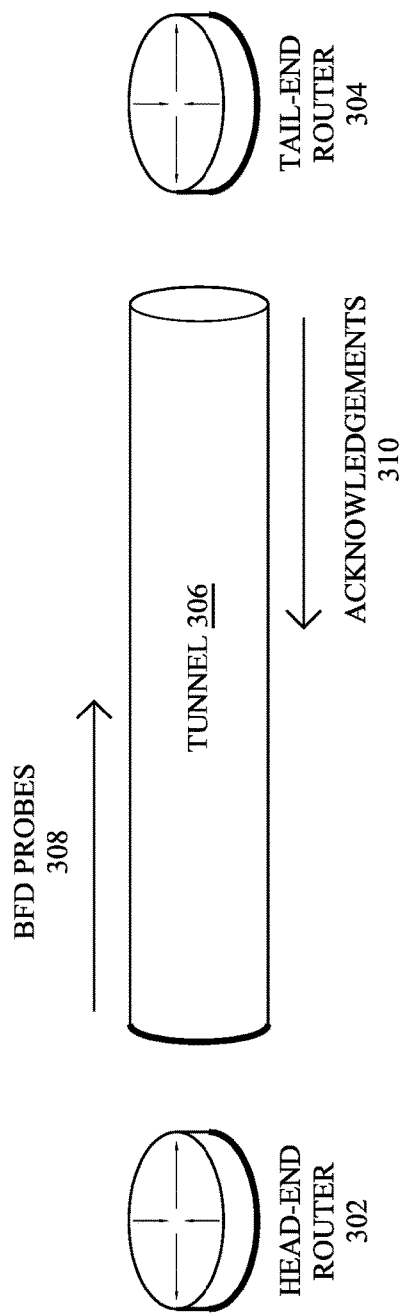
FIG. 3 illustrates an example of a tunnel in a network.

As noted above, tunnels in an SD-WAN are typically monitored using Bidirectional Forwarding Detection (BFD) probes. For example, FIG. 3 illustrates an example of a tunnel 306 in a network 300. As shown, assume that network 300 includes a head-end router 302 and a tail-end router 304 (e.g., edge devices). During operation, head-end router 302 may establish tunnel 306 tail-end router 304 via which head-end router 302 may route traffic.

To monitor the status and performance of tunnel 306, head-end router 302 may send BFD probes 308 along tunnel 306 towards tail-end router 304 (e.g., through execution of tunnel probing process 248), which are then acknowledged by tail-end router 304 via acknowledgements 310. Such BFD probes 308 are used both maintaining the state of tunnel 306, as well as monitoring the performance/service level agreement (SLA) characteristics of tunnel 306. For example, BFD probes 308 may be used to determine the amount of jitter, delay, etc. along tunnel 306. Typically, these measured values are averaged out over a sliding time window (e.g., a 10-minute long sliding time window).

In some implementations, the performance metrics of a tunnel that are learned from BFD probing can be used to enable application-aware routing. For example, assume that head-end router 302 is to send traffic for a video conferencing application. Further, assume that the SLA requirements for the video conferencing application (e.g., the jitter experienced by the traffic must be below a threshold X, the delays experienced by the traffic must be below a threshold Y, etc.) are specified by policy. In such a case, head-end router 302 may compare the SLA requirements of the video application traffic to the performance metrics of tunnel 306 learned from the sending of BFD probes 308, to determine whether tunnel 306 can satisfy the SLA requirements of the traffic, before routing the traffic onto tunnel 306. This process can also be repeated over time, to ensure that tunnel 306 still satisfies the SLA requirements of the traffic. If not, head-end router 302 may reroute the application traffic onto another tunnel that is expected to satisfy its SLA requirements.

In addition to assessing the performance of tunnel 306, head-end router 302 can also use BFD probes 308 to detect when tunnel 306 fails. More specifically, if tail-end router 304 fails to acknowledge a BFD probe 308 with a corresponding acknowledgement 310 within a predefined window, head-end router 302 may determine that tunnel 306 has failed. In turn, head-end router 302 may reroute the traffic that was on tunnel 306 onto a different tunnel that is still active.

In large scale deployments, it has been observed that the overhead of maintaining a BFD session and sending BFD traffic leads to a non-negligible load on the head-end router in terms of CPU consumption, potentially leading to sessions flaps, as well other routers along the tunnel, especially on low-end routers in the context of a full mesh. More specifically, testing has revealed that the median number of failures per tunnel per month is typically between 2-9, with a very high $75^{th}$ percentile and maximum number of failures. On average, approximately 0-20% of tunnels failed per day. In addition, testing has revealed that up to 83% of the failures are caused by approximately 1% of tunnels.

While not the sole cause of tunnel failures BFD timeouts due to the additional overhead of BFD probing do lead to tunnel failures. Additionally, BM-probed tunnels may not be marked with the same color as the packets carried by the tunnel due to the additional overhead, leading to the performance metrics measured for the tunnel (e.g., delay, loss, jitter, etc.) not reflecting the actual experience of the traffic. In other words, the measured performance of the tunnel may indicate an SLA violation, while the actual performance experienced by the traffic may be acceptable. This can lead to the traffic being needlessly rerouted onto a backup/secondary tunnel and negatively impacting the traffic.

Telemetry Collection and Analysis for SD-WAN Tunnels

The techniques herein introduce a traffic-based approach for monitoring the liveliness and performance of SD-WAN tunnels that addresses the shortcomings of traditional BFD-based probing. In some aspects, the techniques herein specify several triggers for switching to the traffic-based probing. In another aspect, a mechanism is introduced herein to insert control information in data packets at the head-end of a tunnel that is used by the head-end to measure various performance metrics for the traffic such as delay, loss and jitter. A feedback loop is also introduced herein that allows a central machine learning component to compute machine learning models for the network (e.g., to predict tunnel failures, SLA violations, etc.) by dynamically adjusting the telemetry collection (e.g., in terms of nature, frequency, etc.) based on the performance of the trained models. For example, one objective of the feedback mechanism may be to minimize the telemetry collection while still achieving at least a threshold degree of model performance.

Specifically, according to one or more embodiments herein, a device in a network sends Bidirectional Forwarding Detection (BFD) probes along a network tunnel associated with the device, to collect telemetry regarding the network tunnel. The device monitors an overhead associated with sending the BFD probes along the network tunnel. The device makes a determination that the overhead associated with sending the BFD probes along the network tunnel is unacceptable. The device switches, based on the determination, from sending BFD probes along the network tunnel to modifying data traffic sent via the network tunnel, to collect telemetry regarding the network tunnel.

Illustratively, the techniques described herein may be performed by hardware, software, and/or firmware, such as in accordance with the tunnel probing process 248 and/or routing process 249, which may include computer executable instructions executed by the processor 220 (or independent processor of interfaces 210) to perform functions relating to the techniques described herein.

Figure 4:
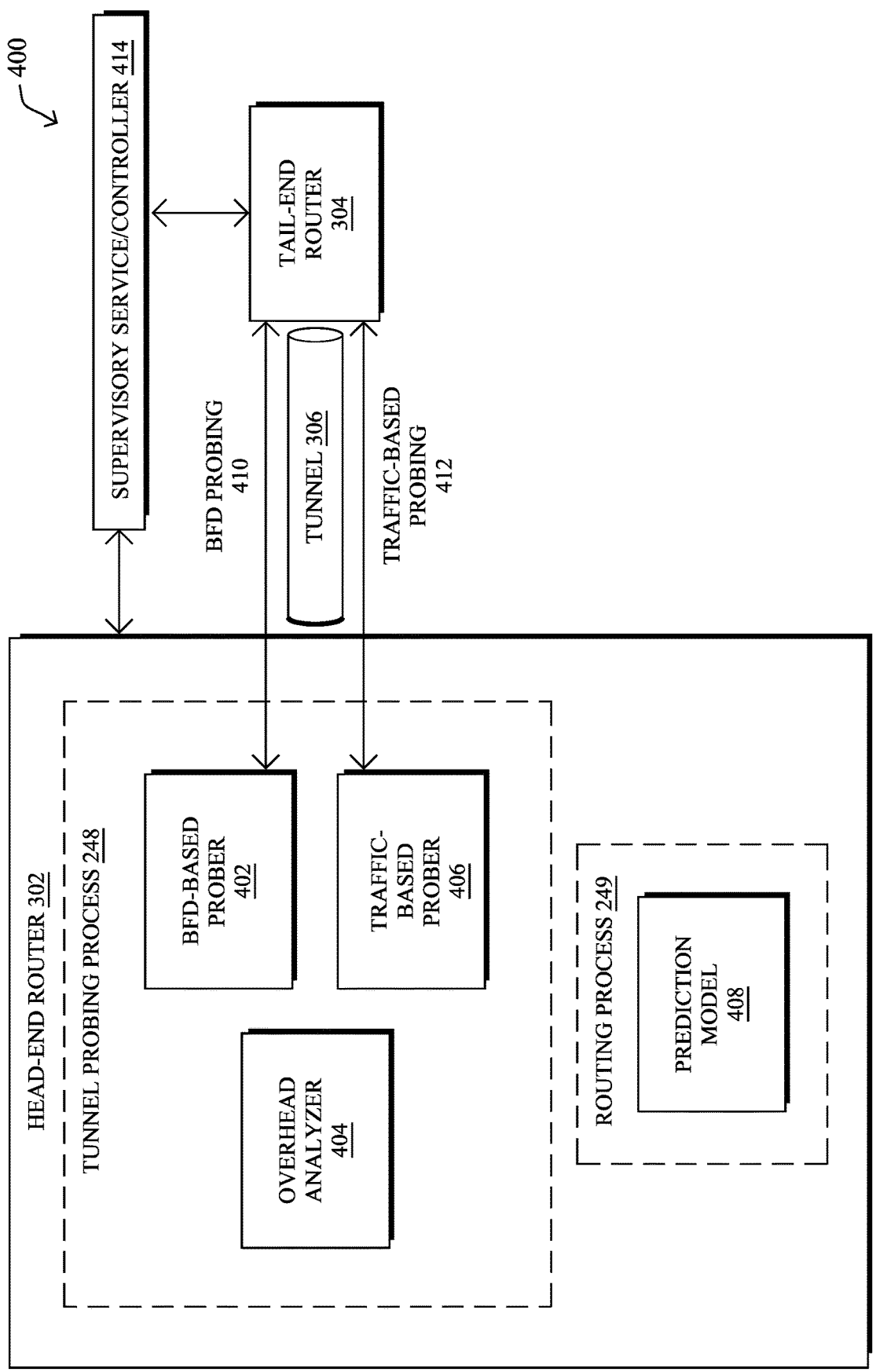
FIG. 4 illustrates an example architecture for the collection and analysis of telemetry for a tunnel.

Operationally, FIG. 4 illustrates an example architecture 400 for the collection and analysis of telemetry for a tunnel, according to various embodiments. Continuing the example of FIG. 3, assume that head-end router 302 executes tunnel probing process 248 and routing process 249. As shown, tunnel probing process 248 may include any or all of the following components: a BFD-based prober 402, an overhead analyzer 404, and/or a traffic-based prober 406. In further embodiments, these components 402-406 may be implemented in a distributed manner or implemented as their own stand-alone services, either as part of the network under observation or as a remote service. In addition, the functionalities of the components of architecture 400 may be combined, omitted, or implemented as part of other processes, as desired.

Head-end router 302 may also execute routing process 249, which is configured to make routing decisions regarding its data traffic. More specifically, routing process 249 may, based on the probing of tunnel 306 by tunnel probing process 248, determine whether certain data traffic should be routed via tunnel 306 or another tunnel. In one embodiment, routing process 249 may be configured to perform application-aware routing meaning that routing process 249 may route data traffic for a particular application via tunnel 306, if the probing of tunnel 306 indicates that tunnel 306 will satisfy the specified SLA of the application. If not, routing process 249 may reroute the application traffic via a secondary/backup tunnel.

Routing process 249 may also use the probing information obtained by tunnel probing process 248 to reroute traffic on tunnel 306, either reactively or proactively. For example, if tunnel probing process 248 determines that tunnel 306 has failed (e.g., based on a BFD session timing out, etc.), routing process 249 may reroute the traffic on tunnel 306 onto a secondary/backup tunnel, reactively. In further embodiments, as detailed further below, routing process 249 may also proactively reroute traffic on tunnel 306 onto another tunnel, based on the probing information indicating that tunnel 306 is likely to fail. Such a prediction may be made either by local execution of a machine learning-based prediction model 408 by router 402 or, alternatively, through coordination with a supervisory service/controller 414 that makes such failure predictions and oversees the operations of routers 302-304. Another form of predictive routing that routing process 249 may support relies on prediction model 408 predicting the performance of tunnel 306, based on the probing by tunnel probing process 248. Such predictions allow routing process 249 to proactively reroute at least a portion of the data traffic on tunnel 306, if tunnel 306 is predicted to be unable to satisfy the SLA of the traffic in the future.

For simplicity, only the components of head-end router 302 are shown in FIG. 4. However, in various embodiments, tail-end router 304 may also execute any or all of the components of head-end router 302, such as the various components of processes 248-249 described herein.

During operation, as detailed previously, BFD-based prober 402 may conduct BFD probing 410 of tunnel 306 with tail-end router 304. In various embodiments, head-end router 302 may also execute overhead analyzer 404 that is responsible for assessing the overhead associated with BFD probing 410 by BFD-based prober 402. To do so, overhead analyzer 404 may assess the resources consumed by head-end router 302, such as its current CPU load, memory usage, queue length(s), queue processing time(s), (sub)interface bandwidth usage, and the like. In addition, overhead analyzer 404 may also assess the performance metrics of the tunnels maintained by head-end router 302, such as tunnel 306. For example, overhead analyzer 404 may also assess the changes to tunnel 306 in terms of delay, loss, jitter, traffic load, etc. that are attributable to BFD probing 410 by BFD-based prober 402.

If overhead analyzer 404 determine that the overhead associated with BFD probing 410 exceeds a certain threshold, it may raise an alert. In a simple embodiment, such a threshold may be static (e.g., a percentage of the CPU usage, queue length, queue processing time, bandwidth usage, etc.). In a more advanced embodiment, overhead analyzer 404 may leverage machine learning, to determine that the overhead associated with BFD probing 410 by BFD-based prober 402 is unacceptable. For example, overhead analyzer 404 may execute an anomaly detector configured to detect when a high rate of BFD flaps is correlated with the resources consumed by router 302 using Pearson's correlation coefficients or the like. Although correlation does not necessarily mean causation, overhead analyzer 404 may nonetheless raise an alert, if it determines that tunnel flaps are highly correlated with spikes in the resources consumed by router 302 to perform BFD probing 410.

In further embodiments, overhead analyzer 404 may trigger an alert based on a measure of how abnormal the resources consumed by BFD probing 410 are. To do so, overhead analyzer 404 may model the 'normal' resource consumptions associated with BFD-based prober 402 performing BFD probing 410. In turn, overhead analyzer 404 may raise an alert if the observed resource consumptions deviate from this model by a threshold amount. For example, if it is expected that BFD probing 410 will increase the CPU usage of router 302 by 10%, an observed increase of CPU usage by 30% may cause overhead analyzer 404 to deem this increase abnormal and raise an alert.

A key aspect of the techniques introduced herein relates to the concept of traffic-based probing, which can be used as an alternate mechanism to probe the tunnels of head-end router 302, such as tunnel 306. To this end, tunnel probing process 248 may also include traffic-based prober 406 that is configured to perform traffic-based probing 412 of tunnel 306. In general, traffic-based prober 406 may be activated by overhead analyzer 404 raising an alert regarding the overhead imposed by BFD-based prober 402 performing BFD probing 410. In other words, tunnel probing process 248 may switch from performing BFD probing 410 to performing traffic-based probing 412, based on overhead analyzer 404 determining that the overhead associated with BFD probing 410 is unacceptable.

Tunnel probing process 248 may automatically perform the probing mechanism switchover (e.g., when overhead analyzer 404 raises an alert) and may also do so according to a defined policy. For example, such a policy may specify the overhead thresholds used by overhead analyzer 404, as well as their respective actions (e.g., a lesser overhead threshold that is used to adjust the parameters of BFD-based prober 402, a greater overhead threshold that is used to switch to traffic-based probing 412, etc.). In addition, such a policy may also be used by tunnel probing process 248 to control when and if BFD probing 410 is to resume, after switching to traffic-based probing 412.

To initiate traffic-based probing 412, traffic-based prober 406 may send a custom message to tail-end router 304 requesting activation of traffic-based probing 412 of tunnel 306, or for a set of tunnels between routers 302-304. For example, such a message may specify any or all of the following attributes to tail-end router 304: the set of tunnels (e.g., a set of tunnel identifiers) for which traffic-based probing is to be used, the types of metrics to be collected (e.g., loss, delay, jitter, etc.), and/or specific attributes for each type of metric/variables. Once enabled, traffic-based probing 412 allows tail-end router 304 to monitor the specified performance metrics of the data traffic along the tunnel(s).

In various embodiments, traffic-based prober 406 may perform traffic-based probing 412 in part by modifying the tunnel encapsulation associated with tunnel 306, to add sequence information. For example, in IPv6, traffic-based prober 406 may place the sequence information in a destination object that is within the outer (tunnel) encapsulation and protected by IPSec. When traffic-based probing 412 is enabled, traffic-based prober 406 may add sequence information to all data packets encapsulated by head-end router 302 and sent via tunnel 306. In one embodiment, traffic-based prober 406 may also add a timestamp to the packets, as well. In a further embodiment, traffic-based prober 406 may additionally include the most recent sequence number that it receives from the other side of tunnel 306, tail-end router 304.

Based on the information inserted into the data packets sent by head-end router 302 via tunnel 306, tail-end router 304 may compute the performance metrics for the traffic. For example, tail-end router 304 may infer a loss ratio for the traffic by identifying gaps in the sequence counters. Similarly, tail-end router 304 may assess any variation of the difference between its local time and the time indicated by the timestamps added by traffic-based prober 406. Assuming that tunnel 306 is roughly symmetrical, tail-end router 304 can also compute the latency of the traffic by dividing an observed round trip in two. As would be appreciated, these computations involve only simple arithmetic, making their resource consumptions comparatively low and can even be implemented directly in hardware. To further conserve resources, tail-end router 304 may report these metrics to head-end router 302 on a periodic basis or on detection of a performance metric crossing a predefined threshold. If, for example, tail-end router 304 identifies a spike in the difference between its local time and the timestamps of the data traffic, tail-end router 304 may signal to head-end router 302 that the traffic should be rerouted onto a different tunnel.

More specifically, once tail-end router 304 has computed the performance metric(s) for the data traffic sent via tunnel 306, it may report this information back to head-end router 302. In various embodiments, tail-end router 304 may do so by aggregating the calculated loss and jitter as statistical values that are reported back to head-end router 302 by tail-end router 304. For instance, tail-end router 304 may report, after a period of X-number of seconds or a number Y of packets, whichever comes first, any or all of the following performance metrics for the traffic sent via tunnel 306: the minimum successful packet deliveries between error, the minimum time between error, the average and/or root mean square values of the above, the maximum number of losses in a row, combinations thereof, or the like.

As would be appreciated, the delay (or latency) of the traffic sent via tunnel 306 can only be observed as half of a round trip. Since the paths between routers 302-304 may be asymmetrical, one direction alone cannot be measured. Still, a variation of the latency that is observed on non-parallel links (e.g., it happens on links A-B and B-C at the same time) is indicative of the location of a bloat that is virtually "near" the common end, B in this case, meaning that other transmissions for B can also be impacted. In various embodiments, a correlation between parallel tunnels and even between non-parallel tunnels can be determined, to establish a measure of interdependence. This information can be used to determine, for example, whether there is a common physical link that creates a bloat on multiple tunnels, whether there is history of two tunnels that dropped at the same time, indicating a shared risk link group (SRLG), etc.

A further aspect of the techniques herein introduces a feedback mechanism to control the traffic-based probing of a tunnel, according to various embodiments. This is particularly useful in the case in which proactive routing is used to make routing decisions before actual problems occur.

FIG. 5 illustrates an example architecture 500 for implementing proactive routing in a network using machine learning, according to various embodiments. Continuing the above examples, assume that supervisory service/controller 414 provides control over the various edge devices of the network, such as head-end router 302 and tail-end router 304. In various embodiments, supervisory service/controller 414 may utilize machine learning for purposes of predicting tunnel failures and/or an inability of a tunnel to satisfy a traffic SLA.

In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, supervisory service/controller 414 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of an SD-WAN tunnel failure or indicative of normal tunnel operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that supervisory service/controller 414 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that an SD-WAN tunnel will fail. Conversely, the false negatives of the model may refer to the number of times the model predicted normal tunnel operations, when the tunnel actually fails. True negatives and positives may refer to the number of times the model correctly predicted whether a tunnel will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In various embodiments, supervisory service/controller 414 may include any or all of the following components: a telemetry collection module 502, a machine learning failure forecasting (MLFF) module 504, and/or a model retraining module 506. These components 502-506 may be implemented in a distributed manner or implemented as their own stand-alone services, either as part of the network under observation or as a remote service. In addition, the functionalities of the components of architecture 500 may be combined, omitted, or implemented as part of other processes, as desired. Supervisory service/controller 414 may also be in communication with any number of edge devices (e.g., a first through $n^{th}$ device), such as head-end router 302 and tail-end router 306, described previously.

In general, there are many circumstances in a network that can lead to tunnel failures in various areas of the network between a head-end and tail-end router (e.g., between routers 302-304, etc.). An objective of MLFF module 504, as detailed below, is to learn early signs (networking behavioral) that have some predictive power, allowing the model to predict/forecast a tunnel failure. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the head-end router 302 involved and may be localized to the core of the service provider network (e.g., the underlying IP, 4G, 5G, etc. network), in which case the failure is non-predicable from the perspective of the head-end router 302.

A first aspect of architecture 500 relates to telemetry collection module 502 obtaining the telemetry data required for model training by MLFF module 504. As used herein, the term 'relevant telemetry' refers to a telemetry measurement variable with predictive power to predict tunnel failures, which can be determined dynamically by MLFF module 504. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from routers 302-304, supervisory service/controller 414 may send a custom request to one or more of routers 302-304 with the objective of obtaining the list of events of interest along with the set of candidate telemetry variables with potential predictive power to predict tunnel failures. In further embodiments, edge routers 302-304 may instead provide the telemetry data to supervisory service/controller 414 on a push basis (e.g., without supervisory service/controller 414 first requesting the telemetry data).

In various embodiments, as detailed further below, telemetry collection module 502 may adjust the set of telemetry variables/parameters obtained from the router and/or their sampling frequency (e.g., via BFD-based probing and/or traffic-based probing). If, for example, MLFF module 504 determines that a particular telemetry variable has a strong predictive power (e.g., according to the feature importance, Shapley values, etc.), the frequency at which such a variable may be gathered may be higher compared to a variable with lower predictive power. MLFF module 504 may also determine the predictive power of a particular telemetry variable by assessing the conditional probabilities involved, in further embodiments.

MLFF module 504 may also select the set of most relevant telemetry variables. In turn, telemetry collection module 502 may request that edge routers 302-304 measure and send these variables to supervisory service/controller 414 periodically, since real-time variations of such telemetry is needed for forecasting tunnel down events. For example, based on the above conclusion, MLFF module 504 may determine that the CPU and memory utilizations of one or more networking devices that support a given tunnel should be sent periodically (e.g., every 1 second) by edge routers 302-304.

Other telemetry variables, such as during a rekey failure when the edge router is not able to successfully exchange the security keys with the controller, may also be requested to be sent to supervisory service/controller 414, on occurrence of the event. Since such events are rare and the states of the variables remain the same for longer periods of time, telemetry collection module 502 may request an event-based push request, rather than periodic messages. In other words, telemetry collection module 502 may instruct one or more of edge routers 302-304 to report certain telemetry variables only after occurrence of certain events. For example, Table 1 below shows some example telemetry variables and when an head-end router 302 may report them to supervisory service/controller 414:

TABLE 1

| Relevant Telemetry | Request Type |
| --- | --- |
| Memory_utilization | Requested from head and tail edge routers. |
| CPU Utilization | |
| BFD Probe Latency, Loss and Jitter | Periodically once every 1 second. |
| Queue statistics (%-age drops for different queues) | |
| Interface down event | Requested from both head and tail edge routers |
| Rekey exchange failure | |
| Router crash logs | Upon event occurrence. |

In a further embodiment, MLFF module 504 may also attempt to optimize the load imposed on the routers 302-304 reporting the telemetry variables to supervisory service/controller 414. For example, MLFF module 504 may determine that the CPU and memory usages should be measured and reported every minute to supervisory service/controller 414.

A key functionality of MLFF module 504 is to train any number of machine learning-based models to predict tunnel failures in the SD-WAN(s). For simplicity, such tunnel failures may refer to actual tunnel failures (e.g., when a tunnel is completely down) and/or failures of the tunnel to satisfy a given traffic SLA (e.g., the tunnel is predicted to have a delay greater than a defined SLA threshold, etc.). Preferably, the models are time-series models trained centrally (e.g., in the cloud) using the telemetry collected by telemetry collection module 502. In one instantiation of MLFF module 504, the models may be trained on a per customer or per-SD-WAN basis. Testing has shown that model performance may be influenced by parameters specific to a given network instantiation, thus promoting an implementation whereby MLFF module 504 trains a model for a specific network deployment. In further embodiments, MLFF module 504 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall>0 is a significant gain. One performance metric that MLFF module 504 may consider is the maximum recall (Max_Recall) achieved by the model given a precision>P_Min. For example, MLFF module 504 may evaluate the variability of Max_Recall across datasets, should a single model be trained across all datasets, to determine whether an SD-WAN specific or even a tunnel specific model should be trained.

In various embodiments, MLFF module 504 may dynamically switch between per-tunnel, per-customer/SD-WAN, and global (multiple SD-WAN) approaches to model training. For example, MLFF module 504 may start with the least granular approach (e.g., a global model across all customers/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision>P_min.

In some cases, MLFF module 504 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the edge routers 302-304 may be in charge of observing the routed traffic and, on detecting a traffic type matching the policy, request specific model training by MLFF module 504, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 504 has trained a prediction model, different options exist for its inference location (e.g., where the model is executed to predict tunnel failures). In a first embodiment, model inference is performed centrally (in the cloud), thus co-located with the model training. In such a case, once MLFF module 504 identifies the set of telemetry variables with predictive power (used for prediction), telemetry collection module 502 may send a custom message to the corresponding routers 302-304 listing the set of variables along with their sampling/reporting frequencies. Note that sampling is a dynamic parameter used by MLFF module 504 computed so as to optimize the PRC of the model against the additional overhead of the head-end router 302 pushing additional data to the cloud (and also generating additional logging of data on the router).

In another embodiment, MLFF module 504 may push the inference task, and the corresponding prediction model, to a specific head-end router, such as head-end router 302, so that the prediction is preformed on-premise. This approach may be triggered, for example, by the frequency of sampling required to achieve the required model performance. For instance, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on head-end router 302 are sufficient to feed the local model.

Thus, in some cases, the techniques herein support centralized model training (e.g., in the cloud), combined with the ability to perform local (on-premise) inference based on the required sampling frequency, local resources available on the head-end router 302, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 504 may take this constraint into account by evaluating the volume of required telemetry, according to the sampling frequency, and the WAN bandwidth allocated on the network for the telemetry traffic. To that end, MLFF module 504 may analyze the topology of the network and the available bandwidth for telemetry reporting (e.g., according to the QoS policy). If the bandwidth available for the telemetry used for the inference of the model exceeds the capacity, MLFF module 504 may decide to activate a local inference by pushing a prediction model to one or more of edge routers 302-304.

In yet another embodiment, MLFF module 504 may take a mixed approach whereby some of edge routers 302-304 perform the inferences locally, while others rely on supervisory service/controller 414 to perform the predictions.

A further embodiment of the techniques herein introduces a feedback mechanism whereby feedback regarding the predictions by a trained model is provided to model retraining module 506. In cases in which the model is executed on head-end router 302, head-end router 302 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 506 may trigger MLFF module 504 to retrain the model, potentially increasing the granularity of the model, as well (e.g., by training a tunnel-specific model, etc.). In cases in which MLFF module 504 trains multiple prediction models, model retraining module 506 may evaluate the performance of each model and, based on their performances, decide that a particular one of the models should be used. Such an approach allows MLFF module 504 to dynamically switch between models, based on the data pattern currently being observed.

When failures are predicted in the cloud by supervisory service/controller 414, model retraining module 506 may similarly receive feedback from routers 302-304 regarding the predictions. For example, once a model M predicts the failure of a tunnel at a given time, MLFF module 504 may send a notification to the affected head-end router 302 indicating the (list of) tunnel(s) for which a failure is predicted, along with the predicted time for the failure, and other parameters such as the failure probability Pf (which can be a simple flag, a categorical variable (low, medium, high) or a real number). Head-end router 302 may use Pf to determine the appropriate action, such as pro-actively rerouting the traffic that would be affected by the failure onto a backup tunnel. In one embodiment, the predicted failure may be signaled to the head-end router 302 using a unicast message for one or more tunnels, or a multicast messages signaling a list of predicted failure to a set of edge routers 302-304.

Regardless of how model retraining module 506 receives its feedback, either from the head-end router 302 executing the prediction model or from MLFF module 504 executing the model, model retraining module 506 may dynamically trigger MLFF module 504 to retrain a given model. In one embodiment, the model re-training may be systematic. In another embodiment, upon reaching a plateau in terms of improvement for Max_Recall or Max_Precision, model retraining module 506 may reduce the frequency of the model training.

As noted, a further aspect of the techniques herein is a feedback mechanism that allows for the dynamic adjustment of the tunnel-based probing, according to various embodiments. Under this approach, a feedback loop is used between the central service and the routers/devices involved in the telemetry collection, to achieve a given objective. For example, one objective may be to minimize the amount of telemetry collected while still achieving at least a threshold degree of model performance. In such a case, the outcomes of the prediction model and its accuracy can be leveraged, to adjust the telemetry collection (e.g., to collect more or less telemetry values, to control the frequency of the collection, etc.).

In the case of tunnel failure prediction, supervisory service/controller 414 may monitor the measured recall for the model (e.g., the percentage of tunnel failures effectively detected by the model) and/or its precision (e.g., the percentage of tunnel failures being correct: TP/TP+FP). One strategy may be to start with a relatively conservative set of parameters (e.g., a small number of telemetry data values to be collected and at a relatively infrequent pace). Then, the types of telemetry and/or its collection frequency can be increased until a suitable tradeoff is found. For example, in the case of tunnel-based probing being used to insert timestamps into actual data traffic on a tunnel, supervisory service 414 may dynamically adjust the frequency of timestamped data packets for which a timestamp is inserted (e.g., to measure loss, jitter and/or delay along the tunnel), according to the performance of the prediction model.

Figure 6C:
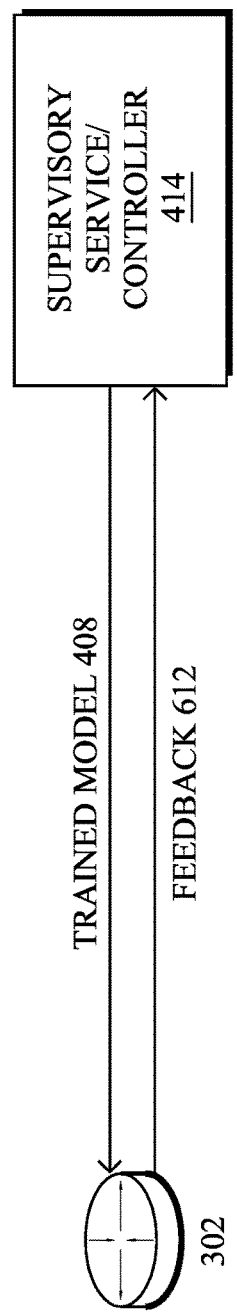

FIGS. 6A-6C illustrate examples of feedback for tunnel failure predictions, in various embodiments. As shown in example implementation 600 in FIGS. 6A-6B, assume that the trained model is executed in the cloud by supervisory service/controller 414. In such a case, supervisory service/controller 414 may send a sampling request 602 to head-end router 302 that indicates the telemetry variables to sample and report, as well as the determined sampling/reporting period(s) for those variables. In turn, head-end router 302 may report the requested telemetry 604 to supervisory service/controller 414 for analysis. For example, supervisory service/controller 414 may request that head-end router 302 report the measured jitter along the tunnel every minute to supervisory service/controller 414, to predict whether the tunnel associated with head-end router 302 is likely to fail. More specifically, supervisory service/controller 414 may use telemetry 604 as input to its trained prediction model, to determine whether telemetry 604 is indicative of a tunnel failure that will occur in the future.

When supervisory service/controller 414 determines that a tunnel failure is predicted, it may send a predicted failure notification 606 to head-end router 302 that identifies the tunnel predicted to fail, the time at which the failure is expected to occur, and potentially the probability of failure, as well. Depending on the timing and probability of failure, head-end router 302 may opt to reroute the affected traffic, or a portion thereof, to a different tunnel. In turn, head-end router 302 may monitor the tunnel predicted to fail and provide feedback 608 to supervisory service/controller 414 indicating whether the tunnel actually failed and, if so, when. Supervisory service/controller 414 can then use feedback 608 to determine whether model retraining should be initiated, such as by training a more granular model for the SD-WAN instance or the specific tunnel under scrutiny. In addition, in various embodiments, supervisory service/controller 414 can use feedback 608 to also control the telemetry capture parameters used by head-end router 302 (e.g., by adjusting subsequent sampling requests 602).

FIG. 6C illustrates an alternate implementation 610 in which supervisory service/controller 414 pushes a trained prediction model 408, shown previously in FIG. 4, to head-end router 302 for local/on-premise inference. For example, supervisory service/controller 414 may opt for head-end router 302 to perform the local inferences, such as when model 408 requires too much bandwidth to send the needed telemetry to supervisory service/controller 414 for cloud-based predictions. In turn, head-end router 302 may use the corresponding telemetry measurements as input to trained model 408 and, if a tunnel is predicted to fail and/or predicted to be unable to satisfy a defined traffic SLA, perform a corrective measure, such as proactively rerouting the traffic to one or more other tunnels.

As in the previous case, head-end router 302 may provide feedback 612 to supervisory service/controller 414 that indicates false positives and/or false negatives by prediction model 408. For example, if head-end router 302 reroutes traffic away from a tunnel predicted by model 408 to fail, and the tunnel does not actually fail, head-end router 302 may inform supervisory service/controller 414. Supervisory service/controller 414 may use feedback 612 to determine whether model 408 requires retraining, such as by adjusting which telemetry variables are used as input to the model, adjusting the granularity of the training (e.g., by using only training telemetry data from the tunnel, etc.), or the like. In addition, supervisory service/controller 414 may adjust the telemetry collection/probing performed by head-end router 302, based on feedback 612, as well.

Figure 7:
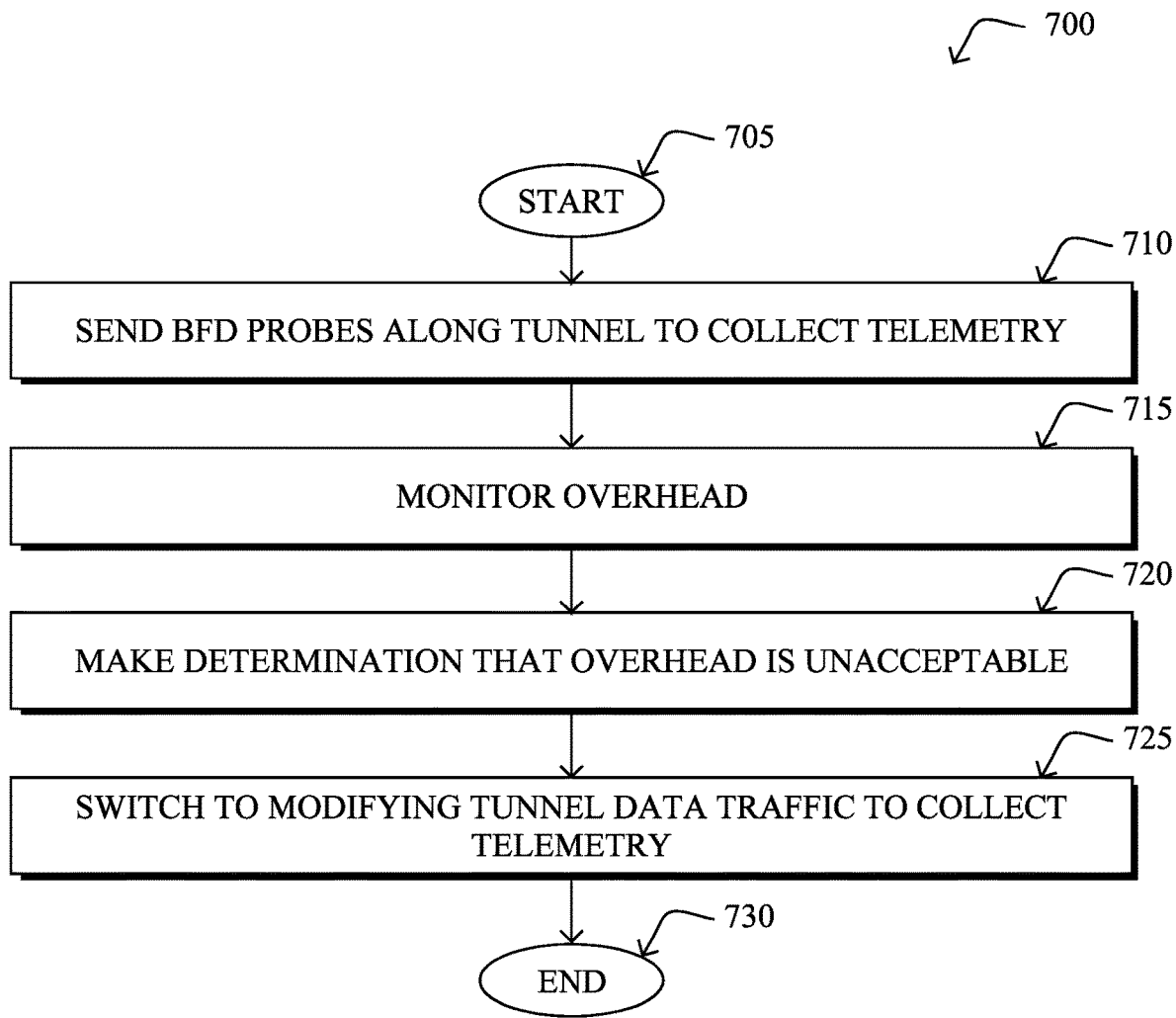
FIG. 7 illustrates an example simplified procedure for collecting telemetry regarding a network tunnel.

FIG. 7 illustrates an example simplified procedure for collecting telemetry regarding a network tunnel, in accordance with one or more embodiments described herein. For example, a non-generic, specifically configured device in a network (e.g., device 200) may perform procedure 700 by executing stored instructions (e.g., process 248 and/or process 249). The procedure 700 may start at step 705, and continues to step 710, where, as described in greater detail above, the device may send BFD probes along a network tunnel associated with the device, to collect telemetry regarding the network tunnel. For example, the device may comprise a head-end router for the tunnel. In various embodiments, the network may also be an SD-WAN.

At step 715, as detailed above, the device may determine an overhead associated with sending the BFD probes along the network tunnel. In various embodiments, the device may do so by measuring at least one of: a processor load of the device, a memory usage of the device, a queue processing time of the device, or a bandwidth consumption by the device.

At step 720, the device may make a determination that the overhead associated with sending the BFD probes along the network tunnel is unacceptable, as described in greater detail above. In a simple embodiment, the device may determine that the overhead is unacceptable based on the overhead exceeding one or more predefined thresholds. For example, if the CPU load of the device exceeds a certain threshold as a result of sending the BFD probes, the device may determine that the overhead is unacceptable. In further embodiments, the device may determine that the overhead is unacceptable by determining a correlation between the overhead associated with sending the BFD probes and tunnel flaps (e.g., by computing a Pearson's correlation coefficient, etc.).

At step 725, as detailed above, the device may switch, based on the determination in step 720, from sending BFD probes along the network tunnel to modifying data traffic sent via the network tunnel, to collect telemetry regarding the network tunnel. In some embodiments, the device may do so by coordinating, with the tail-end of the network tunnel, modification of the data traffic, prior to modifying the data traffic sent via the network tunnel. For example, the device may modify the data traffic of the tunnel by inserting a sequence number and/or timestamp, allowing the tail-end of the tunnel to compute telemetry such as loss, jitter, or delay along the tunnel. In turn, the device may receive the computed telemetry regarding the network tunnel from the tail-end of the tunnel. In various embodiments, the device may use the collected telemetry regarding the network tunnel to make routing decisions. For example, the device, or a supervisory service in communication therewith, may use the telemetry as input to a machine learning prediction model configured to predict a failure of the network tunnel. In further embodiments, how the data traffic sent via the network tunnel is modified may be adjusted, based on a performance metric associated with the machine learning prediction model. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the use of actual data traffic on a network tunnel to probe the tunnel. In some aspects, this traffic-based probing can be used in lieu of, or in addition to, BFD-based probing of the tunnel. For example, if the overhead associated with sending BFD probes is unacceptable, the head-end of the tunnel may switch to traffic-based probing of the tunnel. In further aspects, the collection of telemetry regarding a tunnel may be dynamically adjusted as part of a feedback loop that also considers the performance of a machine learning model that predicts the performance of the tunnel and/or predicts whether the tunnel will fail, thereby allowing traffic to be proactively rerouted away from the tunnel.

While there have been shown and described illustrative embodiments that provide for collecting telemetry regarding a network tunnel, it is to be understood that various other adaptations and modifications may be made within the spirit and scope of the embodiments herein. For example, while certain embodiments are described herein with respect to using certain models for purposes of predicting tunnel failures, the models are not limited as such and may be used for other types of predictions, in other embodiments. In addition, while certain protocols are shown, other suitable protocols may be used, accordingly.

According to the embodiments herein, a method may specifically comprise: sending, by a device in a network, Bidirectional Forwarding Detection (BFD) probes along a network tunnel associated with the device, to collect telemetry regarding the network tunnel; monitoring, by the device, an overhead associated with sending the BFD probes along the network tunnel; making, by the device, a determination that the overhead associated with sending the BFD probes along the network tunnel is unacceptable; and switching, by the device and based on the determination, from sending BFD probes along the network tunnel to modifying data traffic sent via the network tunnel, to collect telemetry regarding the network tunnel.

In one embodiment, the device receives the telemetry regarding the network tunnel from a tail-end of the network tunnel, wherein the tail-end of the network tunnel uses the modified data traffic to compute the telemetry regarding the network tunnel. In a further embodiment, the device coordinates, with the tail-end of the network tunnel, modification of the data traffic, prior to modifying the data traffic sent via the network tunnel. In one embodiment, modifying the data traffic sent via the network tunnel comprises adding a sequence number of timestamp to the data traffic. In another embodiment, the collected telemetry regarding the network tunnel is used as input to a machine learning prediction model configured to predict a failure of the network tunnel. In one embodiment, an adjustment is made to how the data traffic sent via the network tunnel is modified, based on a performance metric associated with the machine learning prediction model. In another embodiment, measuring the overhead associated with sending the BFD probes along the network tunnel comprises measuring at least one of: a processor load of the device, a memory usage of the device, a queue processing time of the device, or a bandwidth consumption by the device. In another embodiment, the network is an SD-WAN. In one embodiment, making the determination that the overhead associated with sending the BFD probes along the network tunnel is unacceptable comprises determining a correlation between the overhead associated with sending the BFD probes and tunnel flaps.

According to the embodiments herein, an apparatus may comprise one or more network interfaces to communicate with a network; a processor coupled to the network interfaces and configured to execute one or more processes; and a memory configured to store a process executable by the processor, the process when executed configured to: send Bidirectional Forwarding Detection (BFD) probes along a network tunnel associated with the apparatus, to collect telemetry regarding the network tunnel; monitor an overhead associated with sending the BFD probes along the network tunnel; make a determination that the overhead associated with sending the BFD probes along the network tunnel is unacceptable; and switch, based on the determination, from sending BFD probes along the network tunnel to modifying data traffic sent via the network tunnel, to collect telemetry regarding the network tunnel.

According to the embodiments herein, a tangible, non-transitory, computer-readable medium storing program instructions that cause a device in a network to execute a process comprising: sending, by the device in a network, Bidirectional Forwarding Detection (BFD) probes along a network tunnel associated with the device, to collect telemetry regarding the network tunnel; monitoring, by the device, an overhead associated with sending the BFD probes along the network tunnel; making, by the device, a determination that the overhead associated with sending the BFD probes along the network tunnel is unacceptable; and switching, by the device and based on the determination, from sending BFD probes along the network tunnel to modifying data traffic sent via the network tunnel, to collect telemetry regarding the network tunnel.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    sending, by a head-end device of a network tunnel in a network, Bidirectional Forwarding Detection (BFD) probes along the network tunnel to a tail-end device of the network tunnel, to collect telemetry regarding the network tunnel;
    monitoring, by the head-end device, an overhead associated with sending the BFD probes along the network tunnel;
    determining, by the head-end device, whether the overhead associated with sending the BFD probes along the network tunnel is unacceptable; and
    when the head-end device determines that the overhead associated with sending the BFD probes along the network tunnel is unacceptable, switching, by the head-end device, from sending BFD probes along the network tunnel to modifying data traffic sent via the network tunnel by inserting information into data packets sent by the head-end device to the tail-end device, to collect telemetry regarding the network tunnel that is computed by the tail-end device based on the information inserted into the data packets sent by the head-end device.

2. The method as in claim 1, further comprising:
    receiving, at the device, the telemetry regarding the network tunnel from the tail-end device of the network tunnel, wherein the tail-end device of the network tunnel uses the modified data traffic to compute the telemetry regarding the network tunnel.

3. The method as in claim 2, further comprising:
    coordinating, by the head-end device and with the tail-end device of the network tunnel, modification of the data traffic, prior to modifying the data traffic sent via the network tunnel.

4. The method as in claim 1, wherein modifying the data traffic sent via the network tunnel comprises adding a sequence number of timestamp to the data traffic.

5. The method as in claim 1, further comprising:
    using the collected telemetry regarding the network tunnel as input to a machine learning prediction model configured to predict a failure of the network tunnel.

6. The method as in claim 5, further comprising:
    adjusting how the data traffic sent via the network tunnel is modified, based on a performance metric associated with the machine learning prediction model.

7. The method as in claim 1, wherein measuring the overhead associated with sending the BFD probes along the network tunnel comprises:
    measuring at least one of: a processor load of the device, a memory usage of the device, a queue processing time of the device, or a bandwidth consumption by the device.

8. The method as in claim 1, wherein the network is a software-defined wide area network (SD-WAN).

9. The method as in claim 1, wherein making the determination that the overhead associated with sending the BFD probes along the network tunnel is unacceptable comprises:
    determining a correlation between the overhead associated with sending the BFD probes and tunnel flaps.

10. An apparatus, comprising:
    one or more network interfaces to communicate with a network;
    a processor coupled to the network interfaces and configured to execute one or more processes; and
    a memory configured to store a process executable by the processor, the process when executed configured to:
        send, by a head-end device of a network tunnel in the network, Bidirectional Forwarding Detection (BFD) probes along the network tunnel to a tail-end device of the network tunnel, to collect telemetry regarding the network tunnel;
        monitor an overhead associated with sending the BFD probes along the network tunnel;
        determine whether the overhead associated with sending the BFD probes along the network tunnel is unacceptable; and
        when it is determined that the overhead associated with sending the BFD probes along the network tunnel is unacceptable, switch from sending BFD probes along the network tunnel to modifying data traffic sent via the network tunnel by inserting information into data packets sent by the head-end device to the tail-end device, to collect telemetry regarding the network tunnel that is computed by the tail-end device based on the information inserted into the data packets sent by the head-end device.

11. The apparatus as in claim 10, wherein the process when executed is further configured to:
    receive the telemetry regarding the network tunnel from the tail-end device of the network tunnel, wherein the tail-end device of the network tunnel uses the modified data traffic to compute the telemetry regarding the network tunnel.

12. The apparatus as in claim 11, wherein the process when executed is further configured to:
    coordinate, with the tail-end device of the network tunnel, modification of the data traffic, prior to modifying the data traffic sent via the network tunnel.

13. The apparatus as in claim 10, wherein modifying the data traffic sent via the network tunnel comprises adding a sequence number of timestamp to the data traffic.

14. The apparatus as in claim 10, wherein the process when executed is further configured to:
    use the collected telemetry regarding the network tunnel as input to a machine learning prediction model configured to predict a failure of the network tunnel.

15. The apparatus as in claim 14, wherein the process when executed is further configured to:
    adjust how the data traffic sent via the network tunnel is modified, based on a performance metric associated with the machine learning prediction model.

16. The apparatus as in claim 10, wherein the apparatus measures the overhead associated with sending the BFD probes along the network tunnel by:
    measuring at least one of: a processor load of the apparatus, a memory usage of the apparatus, a queue processing time of the apparatus, or a bandwidth consumption by the apparatus.

17. The apparatus as in claim 10, wherein the network is a software-defined wide area network (SD-WAN).

18. The apparatus as in claim 10, wherein the apparatus makes the determination that the overhead associated with sending the BFD probes along the network tunnel is unacceptable by:
    determining a correlation between the overhead associated with sending the BFD probes and tunnel flaps.

19. The apparatus as in claim 10, wherein the apparatus is a head-end router for the network tunnel.

20. A tangible, non-transitory, computer-readable medium storing program instructions that cause a head-end device of a network tunnel in a network to execute a process comprising:
    sending, by the head-end device, Bidirectional Forwarding Detection (BFD) probes along the network tunnel to a tail-end device of the network tunnel, to collect telemetry regarding the network tunnel;
    monitoring, by the head-end device, an overhead associated with sending the BFD probes along the network tunnel;
    determining, by the head-end device, whether the overhead associated with sending the BFD probes along the network tunnel is unacceptable; and
    when the head-end device determines that the overhead associated with sending the BFD probes along the network tunnel is unacceptable, switching, by the head-end device, from sending BFD probes along the network tunnel to modifying data traffic sent via the network tunnel by inserting information into data packets sent by the head-end device to the tail-end device, to collect telemetry regarding the network tunnel that is computed by the tail-end device based on the information inserted into the data packets sent by the head-end device.

* * * * *

UNITED STATES PATENT AND TRADEMARK OFFICE
CERTIFICATE OF CORRECTION

PATENT NO. : 11,121,954 B2  
APPLICATION NO. : 16/743064  
DATED : September 14, 2021  
INVENTOR(S) : Jean-Philippe Vasseur et al.

Page 1 of 1

It is certified that error appears in the above-identified patent and that said Letters Patent is hereby corrected as shown below:

In the Specification

Column 6, Line 17, please amend as shown:  
While not the sole cause of tunnel failures, BFD timeouts Column 6, Line 19, please amend as shown:  
tunnel failures. Additionally, BFD-probed tunnels may not be Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*